Nov. 19, 1968   N. B. KARAU   3,412,219
METHOD OF ADJUSTING AIR GAP IN CENTRAL ARMATURE RECEIVERS
Filed Dec. 28, 1965   3 Sheets-Sheet 1
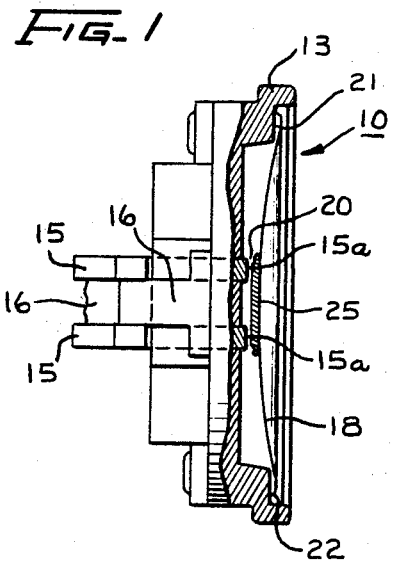
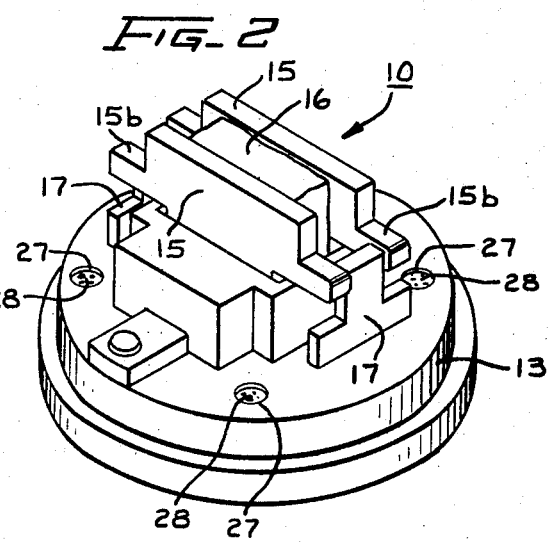
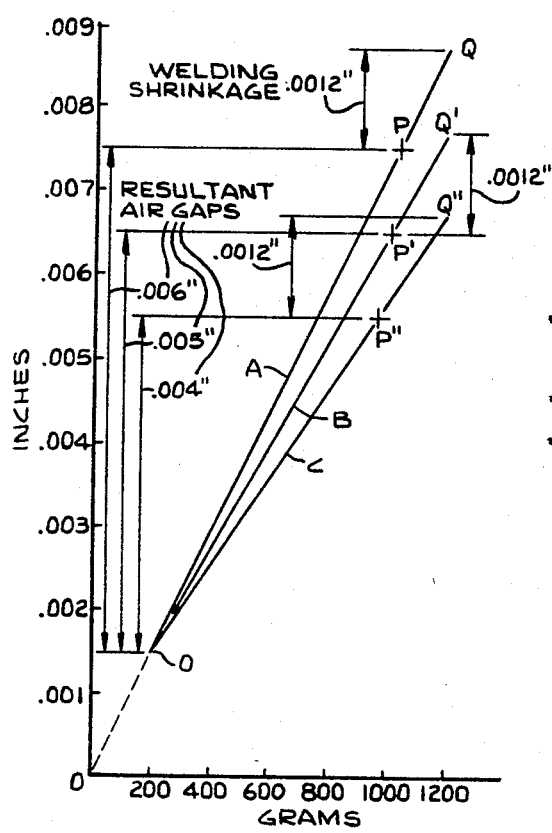
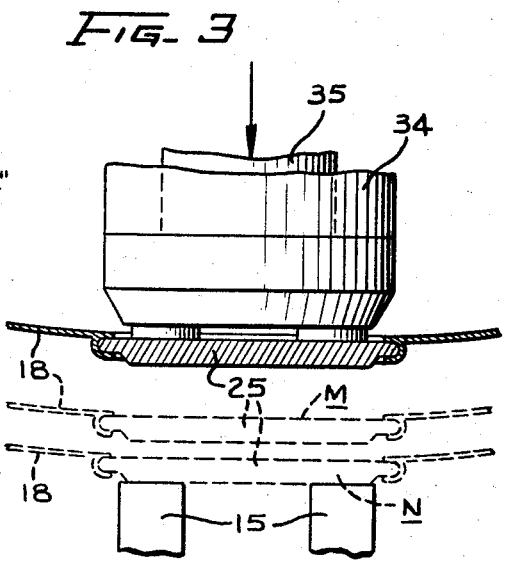
INVENTOR
N. B. KARAU
BY
ATTORNEY

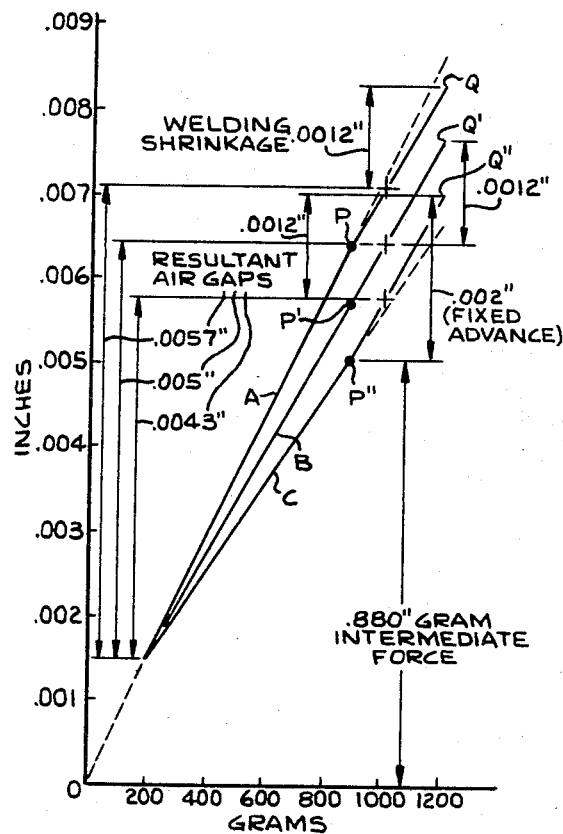
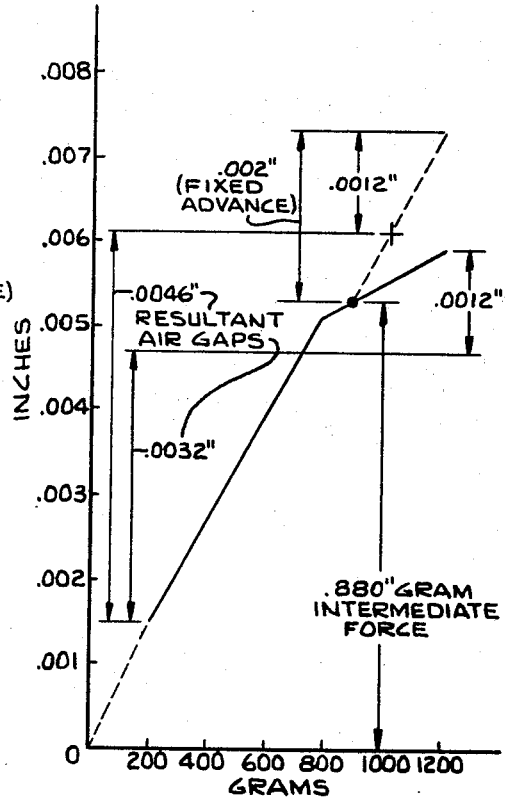
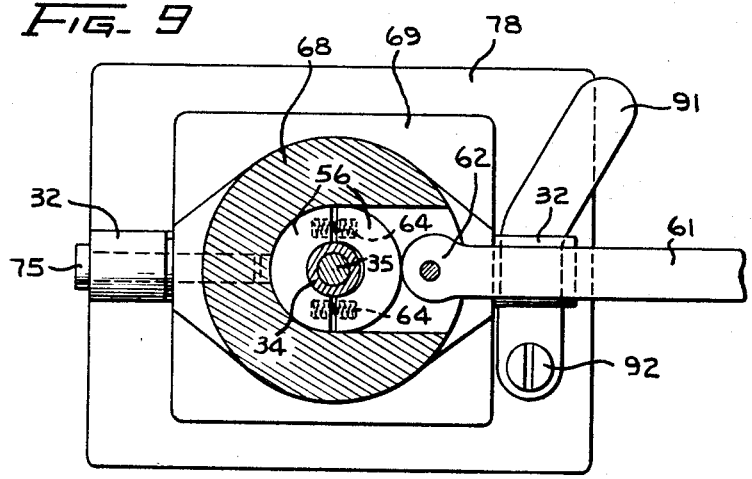

Nov. 19, 1968  N. B. KARAU  3,412,219
METHOD OF ADJUSTING AIR GAP IN CENTRAL ARMATURE RECEIVERS
Filed Dec. 28, 1965  3 Sheets-Sheet 3
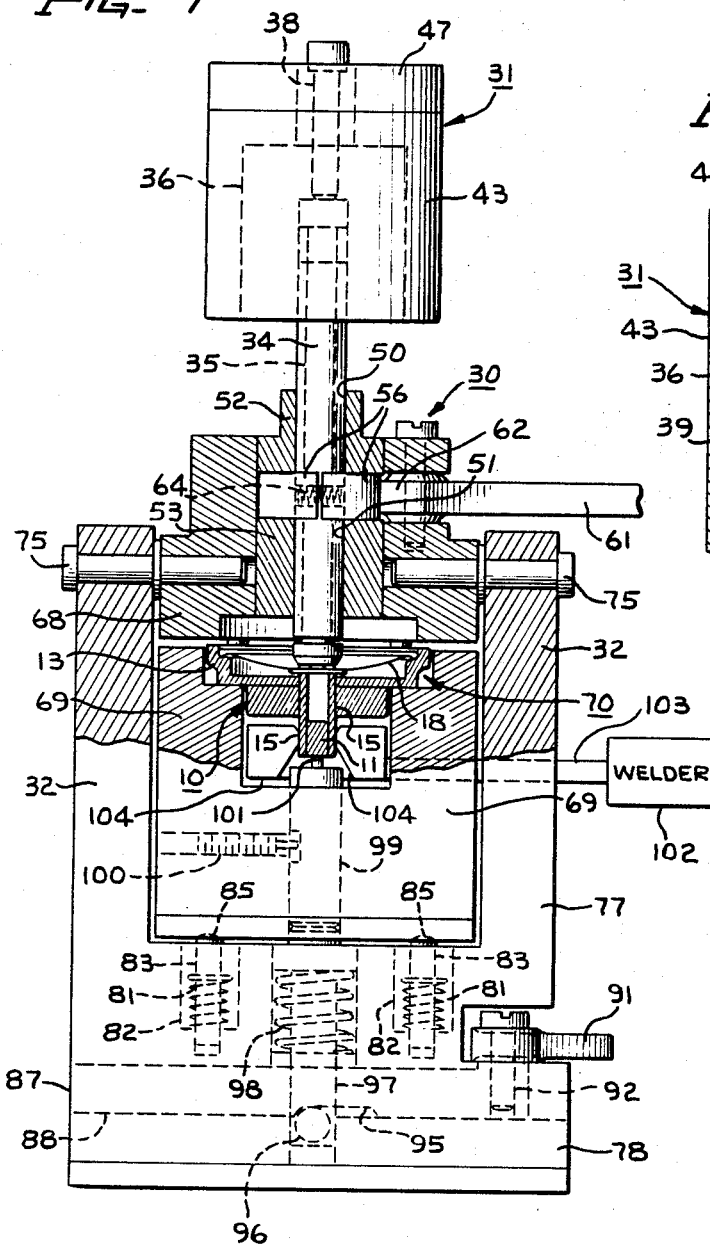
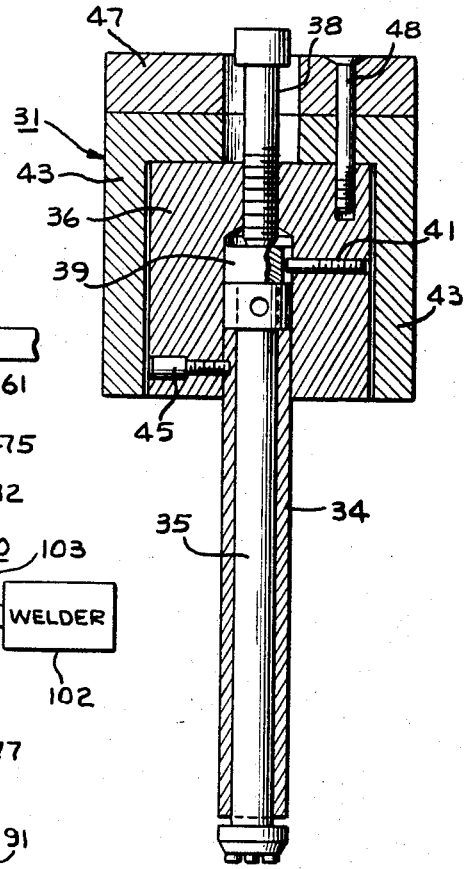

United States Patent Office 3,412,219
Patented Nov. 19, 1968

3,412,219
METHOD OF ADJUSTING AIR GAP IN CENTRAL ARMATURE RECEIVERS
Norbert B. Karau, Indianapolis, Ind., assignor to Western Electric Company, Incorporated, New York, N.Y., a corporation of New York
Filed Dec. 28, 1965, Ser. No. 516,863
6 Claims. (Cl. 179—114)

This invention relates to electrical transducers and, more particularly, to a method of establishing the air gap between the armature and pole tips of central armature receivers.

These receivers normally comprise a small cylindrical armature affixed at its periphery to a larger, thin, annular diaphragm having a slightly concave surface extending downwardly toward the periphery of the armature. The underside of a narrow, annular, planar shoulder formed adjacent the periphery of the diaphragm normally rests on a recessed ridge formed in the frame assembly. A magnet and pole piece assembly is affixed to the frame assembly, such as by welding, on the side opposite the diaphragm assembly, with the mutually opposed free ends of two pole pieces spaced a critical distance beneath the underside of the armature so as to establish a predetermined air gap therebetween.

When such receivers are employed in performance-demanding applications, such as in telephones, considerable care is necessarily required in their assembly and, particularly, in adjusting the air gaps thereof so as to insure that the receivers exhibit substantially uniform and optimum acoustic output characteristics on a large volume, production line basis.

Factors which adversely affect the air gap adjustment of these receivers are the following: (1) variations in diaphragm stiffness, (2) non-linear force-deflection diaphragm characteristics, (3) variations in diaphragm height, and (4) variation in the amount of shrinkage of the air gap between the armature and the pole pieces resulting from the welding of the magnet-pole piece assembly to the frame during manufacture. With respect to these factors, the inherent stiffness variations encountered in the diaphragms, as manufactured, has proven to be the most difficult factor to cope with in the assembly of performance demanding central armature-type receivers. What compounds this problem is that variations in diaphragm stiffness either directly or indirectly result in: (1) magnetic force variations, (2) force-deflection curves which are not uniform and linear, and (3) non-uniform acoustic power output due to variable air gaps.

In order to improve the uniformity of and optimize the acoustic output characteristics of central armature receivers in the telephone industry, a number of different air gap adjusting techniques have been employed heretofore with varying degrees of less than satisfactory success. In one such technique, generally referred to as a "constant force" method, a predetermined weight, such as 1200 grams for one particular type of receiver, was employed to deflect the diaphragm assembly, comprising the central armature and outer diaphragm, a distance dependent primarily on the stiffness of the diaphragm. The weight, after deflecting the diaphragm-armature assembly, was tightly clamped to a supporting fixture so as to be stationary, and the pole tips of the receiver were thereafter forced against the bottom surface of the armature. The magnet-pole piece assembly was then welded to the frame assembly. Upon removal of the receiver from the welding fixture it was magnetized and selectively demagnetized in a stabilizer test set so as to attain a value of permanent flux intended to optimize the acoustic output of the receiver.

To indicate the critical nature of the air gap spacing, in one particular type of receiver, the air gap dimension has to be .005"±.001" in order to meet stringent stability and acoustic requirements. At times, depending upon the stiffness of the diaphragms, it was necessary heretofore to work around a nominal dimension slightly below or above the .005" dimension in order to meet requirements, the ±.001" range, however, usually applied for almost all of the nominal air gaps.

The "constant force" method unfortunately did not produce receivers with either consistent air gaps, or with air gaps which adequately compensated for variations in diaphragm thickness. This is readily seen from the fact that with all the diaphragms subjected to the same "constant force," the degree of deflection and, thereby the resulting air gap, would vary directly with diaphragm stiffness. The degree of variations in diaphragm stiffness typically encountered in large production runs would often result in the ±.001" air gap tolerance limits being exceeded.

Accordingly, in order to use the "constant-force" method with any degree of assuredness, it was necessary to use only segregated lots of diaphragms which exhibited substantially the same force-deflection characteristics. Such an approach obviously proved both time consuming and expensive. Even then, however, there were periods when over 20% of the welded receivers fell outside of the ±.001" air gap variation about a predetermined nominal value. This necessitated that the rejects be recovered either by matching the magnet-pole piece and armature with a different depth diaphragm to attain a workable air gap, or by breaking the welds and rewelding the assembly.

Another technique employed heretofore in an attempt to assure consistent air gaps in the manufacture of central armature receivers may be described as the "magnetic-equivalent force plus fixed deflection" technique, and involved applying a load on the diaphragm-armature assembly equal to the predetermined magnetic attractive force, and thereafter tightly clamping the load to a support fixture. After this a threaded device was used to advance the load an amount equal to the sum of the desired air gap plus the welding shrinkage allowance. At that point, the pole tips were brought into contact with the armature and the magnet-pole piece assembly was welded to the frame of the receiver. By way of illustration, for one particular type of receiver, a fixture was built to apply a magnetic-equivalent force of 200 grams against the diaphragm-armature assembly and thereafter to advance this assembly .0062" such that an air gap of .005" would result after allowance for .0012" of shrinkage. With such a technique, and assuming that both stiff and flexible diaphragms would deflect approximately the same amount of to a 200 gram load, the positive deflection of the diaphragm thereafter was employed in an attempt to produce all receivers with a .005" air gap regardless of the degree of stiffness of the diaphragm assembly.

This method of deflcting the diaphragm also proved to be less than satisfactory because it was later found that a net air gap which is slightly greater than average for the more flexible diaphragms and slightly less than average for the stiffer diaphragms is necessary in order to meet stringent stability and acoustic requirements in a central armature receiver.

Accordingly, it is an object of this invention to facilitate the air gap adjustment of central armature type receivers by compensating for variations in diaphragm stiffness and force-deflection non-linearity in such a manner that optimum stability and acoustic output is assured for each receiver on a production line basis.

It is another object of this invention to provide a method for compensating for variations in the degree of stiffness in diaphragms employed in receivers of the central armature type, whereby consistently acceptable air gaps may be obtained in large volume production runs.

A further object of this invention is to provide an air gap adjustment method which optimizes stability and acoustic receiver output by providing at least a substantial degree of compensation not only for normal stiffness variations in diaphragm assemblies, but also for non-linear force-deflection characteristics.

It is still a further object of this invention to provide a method for adjusting the air gap of central armature type receivers which is reliable, minimizes rejects, is applicable for use on an assembly line basis, and involves apparatus of relatively simple, durable and inexpensive design.

These and other objects of the present invention are embodied in one preferred illustrative method wherein the air gap of the central armature in certain types of telephone receivers is adjusted to compensate, at least substantially, for inherent variations in the degree of stiffness of the diaphragms by initially deflecting at least the central region of the diaphragm, together with the armature through the use of (1) a predetermined force substantially greater than the normal magnetic attractive force followed by (2) an additional fixed advance deflection. As the initial predetermined force is greater than the ultimate magnetic attractive force of the assembled receiver, but less than that employed in the "constant force" method, the present method will be referred to hereinafter as the "intermediate force plus fixed advance deflection method." In the interest of brevity hereinafter, all references to deflection or displacement of the diaphragm or of the diaphragm-armature assembly should be understood to mean, as it relates to the diaphragm, of deflection of the concave central region and/or of the adjacent, substantially planar outer annular region of the diaphragm.

In one particular type of receiver, wherein a normal magnetic attractive force of approximately 200 grams is applied to the diaphragm-armature assembly when assembled, an intermediate force of 880 grams is initially applied thereto, such as by the use of weights. The weight is then tightly clamped to a supporting fixture so as to be stationary. Thereafter, the diaphragm-armature assembly of that particular receiver is subjected to a fixed advance displacement of approximately .002", such as by the use of a threaded vernier type plunger.

After the armature and diaphragm have been displaced in two successive steps by the intermediate force followed by the fixed advanced deflection, the pole piece and magnet assembly are moved upwardly until the pole tips are biased firmly against the underside of the displaced armature. Thereafter, each of the mutually opposed pole pieces are resistance welded at two laterally disposed tab ends thereof to common respective studs extending outwardly from and affixed to the underside of the frame assembly of the receiver.

When the diaphragm is permitted to relax, the initial air gap in accordance with the present method allows for both a slight reduction thereof caused by shrinkage due to cooling after the welding operation, and for a predetermined advancement of the armature toward the pole tips upon being magnetized, and leaves a net acceptable air gap which is slightly greater than average for the more flexible diaphragms and slightly less than average for the stiffer diaphragms.

Stated another way, the significance of the present method, as compared to the constant force method, resides in the fact that it produces a smaller total deflection in flexible diaphragms, and a larger total deflection in stiff diaphragms than in diaphragms exhibiting a nominal or average degree of deflection, while insuring that in all cases the final air gap will fall within acceptable upper and lower limits relative to the nominal value.

Another significant advantage of the subject method is that it also compensates to a substantial extent for non-linearity in the force-deflection characteristics encountered in a sizable number of the diaphragms manufactured in accordance with standard techniques. More specifically, when a non-linear diaphragm employed in one type of receiver is deflected by 1200 grams with the constant-force method, for example, it produces a small air gap of only .0032". As will be appreciated in greater detail hereinafter, the "intermediate force plus fixed advanced deflection" method would produce an air gap of .0046" for the same diaphragm.

The subject method has the further advantage of inherently compensating for variations in diaphragm height, as the fixed advance deflection step normally would produce the same total displacement for all diaphragm-armature assemblies exhibiting substantially the same degree of stiffness.

The subject method therefore in most cases eliminates the need of having to sort diaphragms initially into groups based upon stiffness, and/or of having to readjust the receivers (with or without rewelding) after assembly.

The foregoing and other objects, features and advantages of this invention will become more fully understood from a consideration of the following description and related accompanying drawings, in which:

FIG. 1 is a side elevational view, partly in cross-section, illustrating a typical central armature receiver, the air gap of which is adjusted in accordance with the method of this invention;

FIG. 2 is an isometric view of the receiver of FIG. 1 illustrating in greater detail the magnet pole piece assembly and the manner in which it is supported on the frame;

FIG. 3 is an exploded view pictorially illustrating the "intermediate force plus fixed advance deflection" effects on the diaphragm-armature assembly of the receiver, and the position of the pole tips relative thereto during the welding operation;

FIGS. 4 and 5 are graphs illustrating typical displacement curves for diaphragms exhibiting varying degrees of stiffness, the graphs distinguishing between diaphragms displaced without compensation and with compensation, respectively, the latter in accordance with the principles of this invention;

FIG. 6 is a graph illustrating typical displacement curves for a single diaphragm exhibiting a non-linear force-deflection characteristic when deflected both with a "constant force" method and in accordance with the method of this invention;

FIG. 7 is a front elevational view, mainly in cross-section, illustrating apparatus for practicing the method of this invention;

FIG. 8 is an enlarged sectional view of the intermediate force plus fixed advance deflection mechanism included in the apparatus of FIG. 7, and FIG. 9 is a partial plan view illustrating in greater detail two cam-operated, lever adjusting mechanisms of the apparatus of FIG. 7.

In order to facilitate a better understanding of the air gap adjusting method of the present invention, reference will first be made to FIGS. 1–3 wherein a typical central armature type of receiver 10 is depicted. The receiver comprises a circular frame member 13, generally of die cast aluminum, two mutually opposed pole pieces 15 made, for example of 45% permalloy, and a permanent magnet 16, such as one designated as Alnico VI, mounted between and secured to the pole pieces, such as by soldering. As best seen in FIG. 2, two projecting studs 17, each affixed at one end to the underside of the frame member 13, support the pole pieces 15 at opposite, laterally disposed tab ends 15a, preferably by welds.

The receiver also includes a thin, circular concave diaphragm 18 (FIGS. 1 and 3) supported at its peripheral edge on a recessed ridge 21 formed in the frame member 13. An inner wall 22 associated with the ridge 21 insures that the diaphragm 18 properly seats in the frame member 13 and remains axially aligned therewith.

The diaphragm 18 has a central aperture in which a circular armature 25 is retained, the armature being made, for example, of 2% vanadium Permendur.

As is well known in the art, an air gap 20, typically of the order of .005", is provided between the pole tips 15a and the underside of the armature 25 to provide the proper acoustic response for the receiver. This air gap is critical if stable and optimum acoustic output is to be realized in a given receiver. As best seen in FIG. 2, the frame member 13 also includes a plurality of small apertures 27 therethrough, the number and size of these apertures being dependent, at least in part, on the operating characteristics desired for any given receiver. The apertures 27 each accommodate what is generally referred to as an acoustic disc 28, these discs being inserted under compression, the degree of compression being controlled to provide the proper acoustic damping of the associated diaphragm of the receiver after assembly and adjustment.

With the general construction of a typical central armature receiver well in mind, the method of the present invention, whereby the air gap is adjusted for optimum acoustic output while simultaneously compensating to a considerable degree for variations in the degree of stiffness of the diaphragm will now be described in greater detail.

In accordance with the principles of the present invention, the air gap between the pole tips 15a and the underside of the armature 25 (best seen in FIGS. 1 and 3) is adjusted during the assembly of the receiver by the use of an "intermediate force plus fixed advance deflection" method.

The need for two specific types of forced displacement of the diaphragm-armature assembly arises because of the varying degrees of stiffness encountered in the diaphragms as manufactured. As previously mentioned, applicant has found that in order to produce consistent air gap spaces with a nominal spacing of .005"±.001" in one particular type of central armature receiver, neither the "constant force" method nor the "magnetic-equivalent-force plus fixed deflection" method could be employed successfully.

The "constant force" method did not prove adequate because a single constant force could not compensate for the interrelated factors which necessarily vary with diaphragm stiffness, such as the magnetic force, non-uniformity in the diaphragm force-deflection characteristics and shrinkage variations.

The "magnetic-equivalent-force plus fixed deflection" method similarly proved inadequate in producing air gaps capable of compensating for variations in diaphragm stiffness. This stemmed from the fact it was found that a slightly larger than average air gap is required for flexible diaphragms and a slightly smaller than average air gap is required for stiff diaphragms than for diaphragms exhibiting a nominal or average degree of stiffness, if all of the diaphragms are to meet stringent stability and acoustic requirements.

The deficiencies experienced with the prior methods relating to air gap adjustment may be best illustrated, and the significant aspects of the present method to be described hereafter best distinguished therefrom, by first examining the graphs of FIGS. 4 and 5. FIG. 4 illustrates the deflection of three typical diaphragms wherein the degree of stiffness increases from the curve designated A to the curve designated C. For purposes of this discussion, it is assumed that all three diaphragms would deflect to point O with the application of 200 grams of force. This assumption is particularly valid inasmuch as more than 100 grams of force are normally required in many receivers simply to properly seat the diaphragm-armature assembly in the supporting frame. If a constant force produced by a 1000 gram weight is then applied to the upper surface of the diaphragm-armature assembly of the receiver, for one particular type of receiver, the more flexible diaphragm represented by curve A would deflect an additional .0072" to point Q; the diaphragms associated with curves B and C would deflect an additional .0062" and .0052" to points Q' and Q", respectively.

For the particular receiver under consideration, there is an average shrinkage of .0012" after the magnet-pole piece assembly is welded to the frame which would yield an air gap of .0072"−.0012"=.006" (the distance from point Q to point P) for the diaphragm associated with curve A. Final resultant air gaps of .005" and .004" would result for the diaphragms associated with the curves B and C, respectively, if the "constant-force" method were employed. This is based upon the premise that the average magnetic attractive force of the adjusted receiver is 200 grams.

As previously mentioned, the "constant-force" method does not, in reality, produce air gaps within±.001" of the nominal value on an assembly line basis because some of the diaphragms would inherently exhibit variations in diaphragm stiffness sufficient to produce "constant force" deflections above and below those depicted by curves A and C, respectively, in FIG. 4.

As for the prior "magnetic-equivalent-force plus fixed deflection" method, this involves applying an initial force on the diaphragm-armature assembly equal to the predetermined magnetic attractive force to be associated with the receiver. Thereafter, the diaphragm-armature assembly is advanced an amount equal to the sum of the desired air gap plus the shrinkage allowance.

The displacement effected by the "magnetic-equivalent-force plus fixed deflection" method was obviously based upon the premise that there need not be any selective compensation for stiff diaphragms as opposed to flexible diaphragms relative to one exhibiting a nominal or average degree of stiffness, such as represented by curve B of FIG. 4.

Accordingly, with the prior method in question, it made no difference whether flexible, nominal or stiff diaphragms were encountered (such as represented by curves A, B and C, respectively, in FIG. 4), because they all would necessarily be deflected by the same amount beyond the 200 gram-magnetic-equivalent load point represented by point O in FIG. 4. As a result, it is seen that the "magnetic-equivalent-force plus fixed deflection" method attempted to produce all receivers with a .005" air gap regardless of the degree of stiffness of the diaphragm-armature assembly. This method of adjusting the air gap has proved unsatisfactory because, as previously mentioned, a net air gap which is slightly greater than average for the more flexible diaphragms and slightly less than average for the stiffer diaphragms is necessary if stringent stability and acoustic requirements are to be realized.

It was because of the foregoing deficiencies involved in the prior methods of adjusting the air gap of central armature receivers that the present method was conceived and successfully employed in their manufacture.

In accordance with the subject method, the air gap of these receivers is controlled by initially deflecting the diaphragm-armature assembly through the use of an intermediate, constant force, which is considerably greater than the magnetic force ultimately exerted on the armature, and subsequently subjecting the diaphragm-armature assembly to an additional fixed advance deflection. After the two-step sequence of displacement, the tips of the pole pieces are placed against the displaced armature and welded to the frame in accordance with standard practice. When the diaphragm is permitted to relax, the initial air gap allows for both a slight reduction thereof caused by shrinkage due to cooling after the welding operation, and for a predetermined advancement of the armature toward the pole tips upon being magnetized, and leaves a net air gap which is slightly greater than average for the more flexible diaphragms and slightly less than average for the stiffer diaphragms.

These advantageous results are best appreciated from an examination of the graph of FIG. 5, which represents three typical deflection curves designated A, B and C representative of flexible, average and stiff diaphragms, respectively, for one particular type of receiver designated the LA–1. From these curves, it is seen that an initial force of 880 grams deflects the diaphragm-armature assemblies associated with curves A, B and C to points P, P′ P″, respectively, and that a subsequent fixed advance deflection of .002″ results in a final displacement of these assemblies to the points Q, Q′ and Q″, respectively.

As seen from a comparison of the dotted line and solid line extensions for each of the deflection curves A and C (from points P and P″, respectively), fixed advance deflections of the diaphragm-armature assemblies, which deflections are smaller than those resulting from the initial force (which, in turn, is substantially larger than the finally adjusted magnetic attractive force), causes the diaphragm (Curve C) stiffer than average to be deflected less than the diaphragm (Curve A) which is more flexible than average. The "intermediate force plus fixed advanced displacement" method of this invention would yield air gaps, after allowance for .0012″ of shrinkage, of .0057″, .005″ and .0043″ for the diaphragm-armature assemblies represented by curves A, B and C, respectively, depicted in FIG. 5.

It should be understood that these intermediate force and fixed advance deflection values are not necessarily critical, and indeed, can vary considerably, depending particularly on the design of and operating characteristics desired for any given central armature receiver. In defining the magnitude of the values in question, two factors are of particular significance. First, the initial intermediate force should be greater than the finally adjusted magnetic attractive force, so as to make possible the attainment of net air gaps which fall within tolerable limits, notwithstanding diaphragms being encountered which exhibit appreciable variation in stiffness and/or non-linearity in the force-deflection characteristics thereof. Secondly, the relationship between the magnitude of displacement imparted to the diaphragm-armature assembly effected by the constant intermediate force and the positive fixed advancement should be chosen to produce a net air gap which is slightly greater than average for the more flexible diaphragms and slightly less than average for the stiffer diaphragms.

The present method is thus seen to provide a substantial improvement over the prior methods which, at best, would produce air graps for diaphragms having deflection characteristics corresponding to those represented by curves A–C in FIG. 5 of approximately .004″, .005″ and .006″, respectively. Moreover, with the aforementioned prior methods, it should be appreciated that these air gap variations in practice would often increase beyond the tolerable upper and lower limits of ±.001″ for diaphragms either stiffer or more flexible than those represented by curves A and C, which were chosen only for purposes of illustration herein. As a matter of fact, on large production runs, variations in air gap spacing obtained with the aforementioned prior methods have ranges as far as .003″ to .007″ about a nominal value of .005″for several particular types of receivers employed in current telephone. In those cases, about 40% of the receivers adjusted for air gap were ultimately rejected for having final air gaps falling beyond the .004″ and .006″ limits. Contrarywise, similar production runs of receivers having air gaps adjusted in accordance with the present invention were found to result in less than 20% of the receivers being finally rejected for air gaps exceeding ±.001″ on either side of the nominal spacing of .005″.

Another significant advantage of the present method relates to its compensating effect on diaphragms which exhibit non-linear force-deflection characteristics. More specifically, for unexplained reasons, it has been found that a number of diaphragms, as manufactured, exhibit a pronounced non-linear stiffness rate, particularly when a force from 700–1200 grams is applied thereto. Air gap adjusting of a number of these diaphragms have revealed, from a statistical standpoint, that the prior "constant-force" method, for example, when employed to apply 1200 grams of force against the armature of one particular diaphragm tested for purposes of comparison, produced by an unacceptable air gap of .0032″, for a nominal air gap spacing of .005″. The air gap of the same receiver, when adjusted in accordance with the "intermediate force plus fixed advanced deflection" method of the present invention, produced an air gap of .0046″. The non-linear nature of such a diaphragm and the significantly different end results between the two methods are illustrated in the graph of FIG. 6.

As previously pointed out, the present method, by utilizing an intermediate force and fixed advance displacement, in combination, has the further advantage of inherently compensating for variations in diaphragm height as well as stiffness. With respect to variations in height, of course, all diaphragm-armature assemblies would normally be displaced by the same total amount.

It has thus been shown that the "intermediate force plus fixed advance deflection" method of establishing the air gap in central armature types of receivers provides a substantial degree of compensation for normal stiffness variations encountered in the diaphragms thereof. This method has also been found to produce more nearly correct air gaps for diaphragms exhibiting non-linear force deflection characteristics. As such, the air gap adjusting method of the present invention avoids the necessity of having to sort diaphragms into groups based upon stiffness in order to meet the stringent stability and acoustic requirements dictated in applications in the telephone industry or, in the absence of such sorting, substantially minimizes the time and expense involved in screening finally adjusted receivers and thereafter adjusting the rejects, with or without rewelding, so as to produce air gaps within the required limits.

The "intermediate force plus fixed advance deflection" method of this invention, which is applicable particularly to receivers of the central armature type, may be practiced, by way of example, with the air gap-adjusting apparatus 30 depicted in FIGS. 7–9. As disclosed therein, the apparatus comprises both an intermediate force plus fixed advance deflection mechanism, and a lower, pivotal support housing designated generally by the reference numerals 31 and 32, respectively.

Considering mechanism 31 first in greater detail, it comprises a tubular member 34 which supports an elongated, movable piston 35 axially therewithin. An inner annular support member 36 having an axial bore therethrough accommodates an upper section of the tubular member 34 in a lower portion of the bore, with an upper portion thereof being tapped to accommodate a mutually threaded member 38, the lower end of which contacts the upper end of a short, slidable, driver 39 mounted within the support member 36. The lower end of the driver 39 contacts the upper end of the piston 35. A pointed set screw 41 keys the driver 39 so as to prevent transmission of torque from the threaded member 38 to the piston 35. The support member 36 is secured to the tubular member 34 by means of one or more set screws 45.

In accordance with the principles of the invention, predetermined weights 43 and 47, for establishing the intermediate force on the diaphragm-armature assembly, are placed on the upper surface of the inner annular support member 36, and may be secured thereto by means of one or more set screws 48.

The intermediate force plus fixed-advanced deflection mechanism 31 is mounted within two axially aligned bores 50, 51 of bushings 52, 53, respectively, the bushings being associated with the lower support housing 32 of the apparatus.

A locking mechanism (best seen in FIG. 9) comprises two semi-circular collars 56 which are actuable, in response to the movement of a lever 61 biasing a cam 62 against an adjacent one of the collars 56, to clamp the outer tubular member 34 in a fixed position relative to the bushings 52, 53. A pair of springs 64 normally bias the two semi-circular collars 56 away from each other so as to allow the tubular member 34 to move freely within the bore defined therebetween.

The bushings 52, 53 are secured to an outer support member 68 which, in combination with a lower support member 69, forms a nest designated generally by the reference numeral 70 for supporting a receiver 10 placed therein. Support members 68 and 69, as a composite nest assembly, is supported by and pivotal about a pair of pins 75, these pins extending through bores in and secured adjacent their head ends to an outer U-shaped frame 77. The frame 77 is in turn mounted on a supporting base 78. A pair of springs 81 respectively mounted within associated recessed bores 82 in the lower portion of the U-shaped frame 77 each biases a different one of a pair of pins 83 upwardly into a pair of normally aligned and corresponding recesses 85 in the bottom surface of the lower support member 69. As such, the pins 83 act as detents to lock the pivotal nest assembly, comprising support members 68, 69, in vertical alignment relative to the tubular member 34 during the adjustment of the air gap of a receiver in accordance with the method of this invention.

An elongated cam member 87 mounted within a groove 88 in the base 78 is movable laterally by means of a lever 91 (best seen in FIG. 9). The lever pivots about a pin 92, secured to the base 78, and is connected to the adjacent end of the cam member 87 by a pin movable within a keyway of the latter (not shown). The cam member 87 has a recessed portion 95 in an intermediate region on the underside thereof (FIG. 7) which allows a cam follower 96 and a driving piston 97 connected thereto to move upwardly under the biasing force of a spring 98. The piston 97 extends through a bore in the lower support member 69, urging an axially aligned floating piston 99 upward. Piston 99 is retained by a pointed set screw 100 and has a projecting portion 101 integral with or affixed to the upper end of the piston 99. The projecting portion 101 biases against the magnet 16 of a receiver 10 positioned in the nest 70 so as to bias the pole tips 15a firmly against the underside of the armature 25 (best seen in FIG. 3) after the diaphragm-armature assembly has been displaced downwardly by the desired amount in accordance with the method of this invention.

With the pole tips 15a so biased against the underside of the armature of a receiver, the pole pieces 15 (best seen in FIGS. 1 and 2) are welded to the studs 17 affixed to the frame 13 by any suitable means, such as with a resistance welder 102 supplying the necessary current through suitable electrical connections, represented by the dotted lines 103, to two pairs of electrodes 104 (only one pair being shown in FIG. 7).

In practicing the "intermediate force plus fixed advanced deflection" method of the present invention utilizing the apparatus depicted in FIGS. 7–9, the tubular member 34 is initially withdrawn from the nest area 70 and the piston 35 fully retracted therein. The collars 56 are then actuated by the lever 61 to clamp the tubular member 34 in fixed position relative to the bushings 50, 51. The pivotal support members 68, 69 are then pivoted outwardly as a unit so as to facilitate the placement of a receiver 10 within the nest 70 defined therewithin. Members 68, 69 are then pivoted back to and locked in a vertical position within the U-shaped frame 73 by means of the spring-biased detent pins 83.

Thereafter, the plunger mechanism 31, including the associated predetermined weights 43 and 47, is allowed to move downwardly upon the release of the tubular member 34 from the clamping collars 56 so as to provide the desired intermediate force to be imparted to the diaphragm-armature assembly. For one particular receiver designated the LA–1, the total intermediate force required was 880 grams when used with an air gap adjusting device of the type depicted in FIGS. 7–9. When the tubular member 34, together with the floating piston 35 supported therewithin, is allowed to move downwardly, the terminating end of the piston upon being fully retracted (if not previously retracted manually), contacts the diaphragm-armature assembly and thereafter deflects it a distance dependent upon the stiffness of the diaphragm for the particular force employed. The position of the diaphragm-armature assembly after this initial deflection is represented in phantom by the letter M in the exploded view depicted in FIG. 3. For an average diaphragm employed in the LA–1 receiver, the displacement equals approximately .0057″, as depicted by the vertical distance between points O and P′ in curve B of the graph of FIG. 5.

After this initial intermediate force-imparted deflection, the tubular member is again clamped by the collars 56 so as to remain in a stationary position relative to the nest assembly and the threaded member 38, which may comprise a vernier unit, is thereafter rotated to move the piston 35 downwardly a predetermined distance so as to impart a fixed advance deflection of the diaphragm-armature assembly in accordance with the invention. For a diaphragm exhibiting the characteristics associated with curve B of FIG. 5, this displacement would equal approximately .002″. At this point, the diaphragm-armature assembly has been deflected in two successive steps, first to the position M, and secondly to the position N, both shown in phantom in FIG. 3.

At the point of final displacement of the diaphragm-armature assembly (position N in FIG. 3), the cam member 87 is moved by means of lever 91 so that the recessed cam surface 95 allows the cam follower 96 and spring-biased driving piston 97 to move upwardly so that the projecting portion 101 of the floating piston 99 biases the pole tips 15a of the magnet-pole piece assembly firmly against the underside of the displaced armature 25. At this point, each of two pairs of welding electrodes 104 (only one pair depicted in FIG. 7) respectively bias a different mutually opposed pair of pole piece tabs 15a inwardly (by suitable mechanism not shown) against the projecting end of the particular stud 17 positioned therebetween (best seen in FIG. 2). Thereafter, the welding electrodes effect a resistance weld to secure the pole piece tabs to the end of the associated stud. As both the welder 102 and the electrodes therefor are of commercial design, they have not been disclosed herein in detail.

The assembled receiver is then removed from the fixture, upon moving the cam member 87 laterally to effect the withdrawal of the projecting portion 101 of the piston 99 from the magnet-pole piece assembly, and upon retracting the intermediate force plus fixed-advance deflection mechanism 31, the magnet of the receiver is thereafter magnetized and selectively demagnetized to establish the desired magnetic attractive force on the armature, at which time the air gap would equal approximately .005″ for one particular type of diaphragm exhibiting stiffness characteristics represented by curve B in FIG. 5. This final air gap would have been achieved by the allowance both for a slight reduction thereof caused by shrinkage due to cooling of the assembly following the welding operation, a typical retraction of the pole tips toward the armature equaling about .0012″, and for a predetermined advancement of the armature toward the pole tips resulting from the finally adjusted magnetizing force, which advancement may equal approximately .0015″, to leave a net air gap equal to .005″.

As previously mentioned, the subject method has the advantage of producing a net air gap which is slightly greater than average for the more flexible diaphragms and slightly less than average for the stiffer diaphragms, as clearly illustrated in the curves of FIG. 5. Concomitantly the subject method also produces more nearly correct air gaps for diaphragms exhibiting non-linear force deflection characteristics, as illustrated by the curves in the graph of FIG. 6.

It should be appreciated that while a hand operated mechanism has been described for practicing the "intermediate force plus fixed advance deflection" method of the present invention, it is obvious that numerous other types of force producing plus positive displacement mechanisms, either manual or automated, could be employed to carry out the present method with equal effectiveness. Automated air gap adjusting mechanisms to carry out the present method would find particular utility with machines utilizing in-line or turret feeding of receivers, for example, to independent air gap adjusting and welding stations in succession, or to a single station wherein both operations are performed in succession.

It is to be understood that the specific method described herein is merely illustrative of the general principles of the present invention. Various modifications may be employed in the light of this disclosure by one skilled in the art without departing from the spirit and scope of this invention.

What is claimed is:

1. A method of adjusting the air gap of central armature receivers, which include magnet-pole piece and diaphragm-armature assemblies mounted on a common frame, while compensating for variations in stiffness of the diaphragms thereof, the method comprising:
   supporting the frame of the receiver in a fixed position;
   applying a constant predetermined force against at least the central region of the diaphragm-armature assembly to displace said assembly in the direction of the magnet-pole piece assembly a distance dependent, at least in part, on the degree of stiffness of the diaphragm, said force being at least greater than the finally adjusted magnetic attractive force subjected on the diaphragm-armature assembly by the magnet of the receiver after final assembly;
   displacing the central region of the diaphragm-armature assembly an additional predetermined distance independently of the force required, the latter distance being of a magnitude which, when combined with the distance moved by the diaphragm-armature assembly in response to the constant force initially applied thereto, produces a net air gap which is slightly greater than average for the more flexible diaphragms and slightly less than average for the stiffer diaphragms, and
   biasing the pole tips of the magnet-pole piece assembly firmly against the underside of the armature while said assembly is secured to the frame of the receiver after the air gap has been adjusted.

2. A method in accordance with claim 1, wherein the additional predetermined displacement of the diaphragm-armature assembly independently of the force required produces a net displacement less than the displacement effected by the constant force, and wherein the combined displacements of the diaphragm-armature assembly produces a net air gap which also allows for a slight reduction thereof caused by shrinkage of the welded assembly in being subjected to heat during a subsequent welding operation after adjustment for the air gap, and which net air gap also allows for a small predetermined advancement of the armature toward the pole tips of the magnet-pole piece assembly upon being magnetized to a suitable field strength after final assembly of the receiver.

3. A method of adjusting the air gap of central armature receivers, which include magnet-pole piece and diaphragm-armature assemblies mounted on a common frame, while compensating for variations in stiffness and for any non-linear force deflection characteristics of the diaphragms thereof, the method comprising:
   supporting the frame of the receiver in a fixed position;
   applying a constant predetermined force against at least the central region of the diaphragm-armature assembly to displace said assembly in the direction of the magnet-pole piece assembly a distance dependent, at least in part, on the degree of stiffness of the diaphragm, said force being at least greater than the finally adjusted magnetic attractive force subjected on the diaphragm-armature assembly by the magnet of the receiver after final assembly;
   displacing the central region of the diaphragm-armature assembly by positive advancement an additional predetermined distance which is less than the displacement thereof effected by the initially applied constant force, the relationship between the magnitudes of displacement imparted to the diaphragm-armature assembly effected by the constant force and the positive advancement being chosen to produce a net air gap which is slightly greater than average for the more flexible diaphragms and slightly less than average for the stiffer diaphragms, and which air gap further allows (1) for a slight reduction thereof caused by shrinkage of the welded assembly in being subjected to heat during a subsequent welding operation after adjustment for the air gap, and (2) for a small predetermined advancement of the armature toward the pole tips of the magnet-pole piece assembly upon being magnetized and partially demagnetized to a suitable field strength after final assembly of the receiver, and
   biasing the pole tips firmly against the underside of the armature while the magnet-pole piece assembly is welded to the frame of the receiver after the air gap has been adjusted.

4. A method in accordance with claim 3, wherein the constant predetermined force varies between 365 and 1200 grams, wherein the displacement of the diaphragm-armature assembly by a positive advancement thereof varies in distance between .001 and .006", and wherein the magnetic attractive force subjected on the diaphragm-armature assembly by the magnet of the receiver after final assembly varies between 50 and 364 grams.

5. A method in accordance with claim 4, wherein the net air gap varies between ±.001" about a nominal value between .004 to .006".

6. A method in accordance with claim 3, wherein the constant predetermined force equal approximately 880 grams, the positive advancement of the diaphragm-armature assembly equals approximately .002" to leave a net air gap of approximately .005"±.001" after allowing for approximately .0012" of shrinkage of the welded assembly caused by heat during the welding operation, and further allowing for a small predetermined advancement of the armature toward the pole tips of the magnet pole piece assembly of approximately .0015" as a result of a finally adjusted magnetic field producing a magnetic attractive force of approximately 200 grams on the diaphragm-armature assembly.

No references cited.

KATHLEEN H. CLAFFY, *Primary Examiner.*

A. A. McGILL, *Assistant Examiner.*